2,736,732
Patented Feb. 28, 1956

2,736,732
3,11-DIKETO-17-ALDEHYDE-Δ[4,16]-ANDROSTADIENE AND PROCESS

William S. Knowles, Kirkwood, Mo., assignor to Monsanto Chemical Company, St. Louis, Mo., a corporation of Delaware No Drawing. Application May 15, 1953,
Serial No. 355,399

6 Claims. (Cl. 260—397.3)

This invention relates to methods and novel compounds useful in the synthesis of steroids having hormonal activity. In particular this invention relates to methods and novel compounds useful in the preparation of 3,11-diketo-17-aldehyde-Δ[4,16]-androstadiene

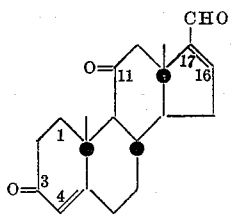

a novel compound having hormonal activity.

The sequence of steps or series of reactions proceeding to the 3,11-diketo-17-aldehyde-Δ[4,16]-androstadiene for purposes of this invention is outlined schematically in the following diagram proceeding from a cyclic acetal of 3-keto-16,17-dihydroxy-Δ[4,9(11)]-D-homoandrostadiene:

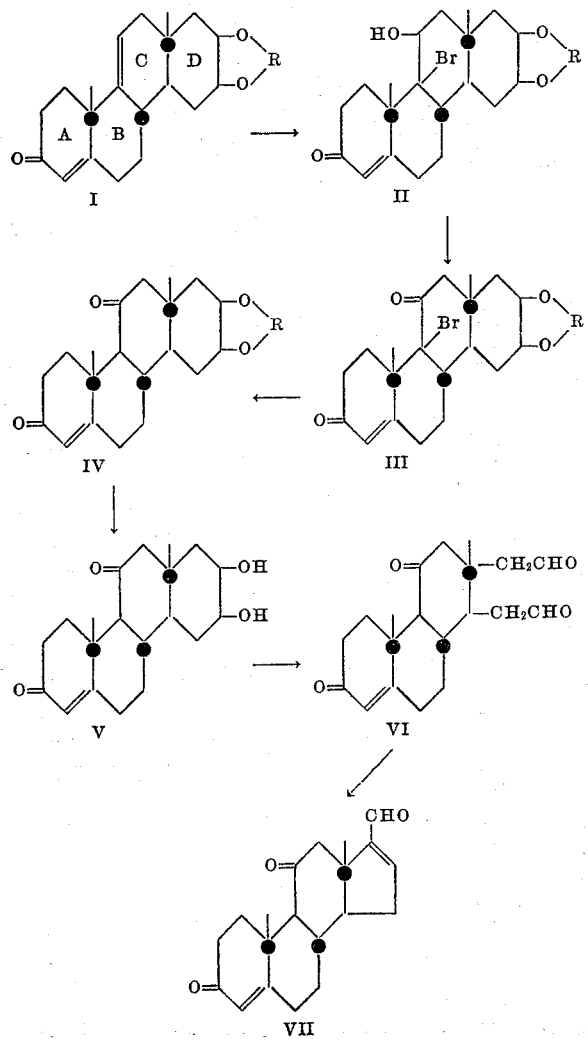

The 3-keto-16,17-dihydroxy-Δ[4,9(11)]-D - homoandrostadiene cyclic acetal reactant, that is compound I of the foregoing schematic diagram where R is a hydrocarbon residue derived from a hydrocarbon aldehyde or ketone, but preferably a symmetrical hydrocarbon ketone, exists in the dl series as well as in the optically active series in two isomeric forms, namely the alpha-acetal and the beta-acetal, either of which can be employed alone or admixed with one another in the process of this invention. This acetal reactant is prepared by reacting a hydrocarbon aldehyde or hydrocarbon ketone, but preferably a symmetrical ketone such as acetone, diethyl ketone, cyclohexanone, p-methylcyclohexanone, etc., with a glycol of the structural formula

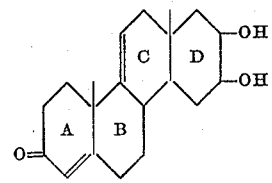

in the presence of a dehydrating catalyst. As will be obvious to those skilled in the art the aforedescribed glycol is a cis glycol (that is the 16-hydroxy substituent and the 17-hydroxy substituent are on the same side of the plane of ring D). Exemplary of such cis-glycols are dl-3-keto-16α,17α-dihydroxy-Δ[4,9(11)] - D - homoandrostadiene
dl-3-keto-16β,17β-dihydroxy-Δ[4,9(11)] - D - homoandrostadiene
l-3-keto-16α,17α-dihydroxy-Δ[4,9(11)] - D - homoandrostadiene
l-3-keto-16β,17β-dihydroxy-Δ[4,9(11)] - D - homoandrostadiene
d-3-keto-16α,17α-dihydroxy-Δ[4,9(11)] - D - homoandrostadiene
d-3-keto-16β,17β-dihydroxy-Δ[4,9(11)] - D - homoandrostadiene The first step in the process of this invention is the addition of hypobromous acid to the 9–11 double bond of the 3-keto-16,17-dihydroxy-Δ[4,9(11)]-D-homoandrostadiene acetal to produce 3-keto-9-bromo-11,16,17-trihydroxy-Δ[4]-D-homoandrostene acetal (compound II). This addition reaction is brought about by mixing a solution of hypobromous acid with a solution of 3-keto-16,17-dihydroxy-Δ[4,9(11)]-D-homoandrostadiene acetal at a temperature in the range of about 0 to 30° C. The 9-bromo and 11-hydroxy substituents so introduced bear a trans-relationship with respect to one another, i. e. one occupies the plane above ring C while the other occupies the plane below ring C. While theoretically the hydroxy substituent enters the plane above ring C, it is to be understood that the bromo-hydrin product (compound II) so produced is not limited to any assumption as to chemical structure but pertains broadly to the 9-bromo-11-hydroxy addition product of hypobromous acid and the cis-glycol acetal (compound I). Various solvents which are inert under conditions of the addition reaction can be used in the preparation of the 9-bromo-11-hydroxy addition product, for example, acetone, methyl ethyl ketone, methyl acetate, ethyl acetate, tertiary butanol, etc.

The hypobromous acid used in the first step of the process of this invention can be prepared in several ways, such as by mixing mercuric oxide with bromine and water and filtering off the mercuric bromide thus formed, or by mixing N-bromoacetamide with water and tertiary butanol or, preferably, by mixing a solution of N-bromo-succinimide

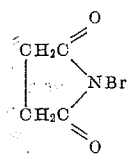

in a suitable inert organic solvent, e. g. acetone, tertiary butanol, with water and a small amount of sulfuric acid. Where desired, the hypobromous acid solution can be prepared first and then mixed with the acetal reactant (i. e. compound I) or, preferably, the hypobromous acid is prepared in the presence of the acetal reactant (i. e. compound I) so that the elements of hypobromous acid add to the 9–11 double bond as soon as they are formed.

As illustrative of the first step of the process of this invention is the following:

*Example I*

To an agitating solution containing substantially 117.4 parts by weight of $dl$-3-keto-16$\beta$,17$\beta$-dihydroxy-$\Delta^{4,9(11)}$-D-homoandrostadiene acetonide, substantially 5600 parts by weight of acetone and substantially 2300 parts by weight of water is added at about 0–5° C. approximately 100 parts by weight of 1 N sulfuric acid. To the so cooled and acidified solution is slowly added a solution containing substantially 69 parts by weight of N-bromo-succinimide in approximately 720 parts by weight of acetone. Upon completion of the N-bromo-succinimide addition the mix is agitated for about 5 hours at about 0–5° C., the bromohydrin crystallizes from the solution during the agitation. At the end of the agitation period aqueous sodium sulfite is added to destroy the excess N-bromo-succinimide and then the mix is neutralized with sodium bicarbonate. The mix is then filtered and the residue washed first with water, then with acetone and dried. Substantially 122.0 parts by weight of a white crystalline material identified as $dl$-3-keto-9-bromo-11,16$\beta$,17$\beta$-trihydroxy-$\Delta^4$-D-homoandrostene acetonide is obtained.

*Example II*

To an agitating solution containing substantially 117.4 parts by weight of $dl$-3-keto-16$\alpha$,17$\alpha$-dihydroxy-$\Delta^{4,9(11)}$-D-homoandrostadiene acetonide, substantially 5600 parts by weight of acetone and substantially 2300 parts by weight of water is added at about 0–5° C. approximately 100 parts by weight of 1 N sulfuric acid. To the so cooled and acidified solution is slowly added a solution containing substantially 69 parts by weight of N-bromo-succinimide in approximately 720 parts by weight of acetone. Upon completion of the N-bromo-succinimide addition the mix is agitated for about 5 hours at about 0–5° C., the bromohydrin crystallizes from the solution during the agitation. At the end of the agitation period sodium sulfate is added to destroy the excess N-bromo-succinimide and then the mix is neutralized with sodium bicarbonate. The mix is then filtered and the residue washed first with water, then with acetone and dried. Substantially 122.0 parts by weight of a white crystalline material identified as $dl$-3-keto-9-bromo-11,16$\alpha$,17$\alpha$-trihydroxy-$\Delta^4$-D-homoandrostene acetonide is obtained.

*Example III*

Employing the procedure of Example I but replacing $dl$-3-keto-16$\beta$,17$\beta$-dihydroxy-$\Delta^{4,9(11)}$-D-homoandrostadiene acetonide with an equimolecular amount of $l$-3-keto-16$\beta$,17$\beta$-dihydroxy-$\Delta^{4,9(11)}$-D-homoandrostadiene acetonide an excellent yield of white crystalline material identified as $l$-3-keto-9-bromo-11,16$\beta$,17$\beta$-trihydroxy-$\Delta^4$-D-homoandrostene acetonide is obtained.

*Example IV*

Employing the procedure of Example II but replacing $dl$-3-keto-16$\alpha$,17$\alpha$-dihydroxy-$\Delta^{4,9(11)}$-D-homoandrostadiene acetonide with an equimolecular amount of $l$-3-keto-16$\alpha$,17$\alpha$-dihydroxy-$\Delta^{4,9(11)}$-D-homoandrostadiene acetonide a good yield of a white crystalline material identified as $l$-3-keto-9-bromo-11,16$\alpha$,17$\alpha$-trihydroxy-$\Delta^4$-D-homoandrostene acetonide is obtained.

*Example V*

Employing the procedure of Example I but replacing $dl$-3-keto-16$\beta$,17$\beta$-dihydroxy-$\Delta^{4,9(11)}$-D-homoandrostadiene acetonide with an equimolecular amount of $d$-3-keto-16$\beta$,17$\beta$-dihydroxy-$\Delta^{4,9(11)}$-D-homoandrostadiene acetonide an excellent yield of white crystalline material identified as $d$-3-keto-9-bromo-11,16$\beta$,17$\beta$-trihydroxy-$\Delta^4$-D-homoandrostene acetonide is obtained.

*Example VI*

Employing the procedure of Example II but replacing $dl$-3-keto-16$\alpha$,17$\alpha$-dihydroxy-$\Delta^{4,9(11)}$-D-homoandrostadiene acetonide with an equimolecular amount of $d$-3-keto-16$\alpha$,17$\alpha$-dihydroxy-$\Delta^{4,9(11)}$-D-homoandrostadiene acetonide a good yield of a white crystalline material identified as $d$-3-keto-9-bromo-11,16$\alpha$,17$\alpha$-trihydroxy-$\Delta^4$-D-homoandrostene acetonide is obtained.

The next step in the process of this invention is the oxidation of the 11-hydroxy substituent of compound II of the foregoing schematic diagram to produce 3,11-diketo-9-bromo-16,17-dihydroxy-$\Delta^4$-D-homoandrostene acetal (compound III).

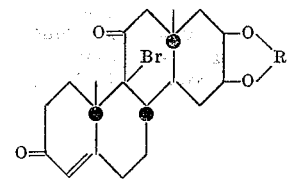

This oxidation step is brought about in an anhydrous system by mixing a complex of chromium oxide and a tertiary amine, such as pyridine or the various picolines, etc., with the 9-bromo-11-hydroxy derivative, namely 3-keto-9-bromo-11,16,17-trihydroxy-$\Delta^4$-D-homoandrostene acetal. As illustrative of this step of the process of this invention is the following.

*Example VII*

To an agitated complex of chromium trioxide and pyridine prepared in the cold by admixing 50 parts by weight of chromium trioxide with 500 parts by weight of pyridine is added substantially 50 parts by weight of $dl$-3-keto-9-bromo-11,16$\alpha$,17$\alpha$-trihydroxy-$\Delta^4$-D-homoandrostene acetonide in approximately 800 parts by weight of pyridine while maintaining the temperature at about 10° C. The mixture so obtained is permitted to stand at room temperature for about 16 hours with occasional agitation. The mixture is then filtered and the residue washed with pyridine. The pyridine wash and the original filtrate are combined and the solution so formed is poured into five times its weight of water and the composite extracted with chloroform. The extracts are combined and cooled to about 0° C. The cooled solution is then washed with dilute hydrochloric acid and then with water. The organic layer is recovered, dried, and subjected to evaporation under vacuum. Substantially 37.5 parts by weight of a crystalline material identified as $dl$-3,11-diketo-9-bromo-16$\alpha$,17$\alpha$-dihydroxy-$\Delta^4$-D-homoandrostene is obtained.

Replacing $dl$-3-keto-9-bromo-11,16$\alpha$,17$\alpha$-trihydroxy-$\Delta^4$-D-homoandrostene acetonide in Example VII with an equal weight of $dl$-3-keto-9-bromo-11,16$\beta$,17$\beta$-trihydroxy-$\Delta^4$-D-homoandrostene acetonide and subjecting same to the series of steps set forth in Example VII an excellent yield of a crystalline material identified as $dl$-3,11-diketo-9-bromo-16$\beta$,17$\beta$-dihydroxy-$\Delta^4$-D-homoandrostene acetonide is obtained.

In a similar fashion crystalline $d$- and $l$-3,11-diketo-9- bromo-16β,17β-dihydroxy-Δ⁴-D-homoandrostene acetonides as well as crystalline d- and l-3,11-diketo-9-bromo-16α,17α-dihydroxy-Δ⁴-D-homoandrostene acetonides are obtained by the oxidation of the corresponding bromohydrin.

The next step in the process of this invention is the preparation of 3,11-diketo-16,17-dihydroxy-Δ⁴-D-homoandrostene acetal (compound IV) by removal of the bromine atom in the 9-position of the bromo-ketone (compound III), namely 3,11-diketo-9-bromo-16,17-dihydroxy-Δ⁴-D-homoandrostene acetal. The bromine atom may be removed by the employment of a metallic reducing agent such as nickel, zinc, etc. It is preferred that zinc and acetic acid be employed and as illustrative thereof is the following:

*Example VIII*

To an agitated solution containing substantially 33.7 parts by weight of dl-3,11-diketo-9-bromo-16α,17α-dihydroxy-Δ⁴-D-homoandrostene acetonide, approximately 2500 parts by weight of glacial acetic acid and approximately 850 parts by weight of water is added approximately 60 parts by weight of zinc dust. The mixture so obtained is agitated at about 15° C. for about 10 minutes. The mix is then filtered and the filtrate is admixed with an equal volume of water and the mix so obtained extracted with several portions of diethyl ether. The ether extracts are combined, washed with water, followed by a sodium carbonate wash and finally with water. The organic solution is then dried and evaporated. Substantially 18.3 parts by weight of a white crystalline material identified as dl-3,11-diketo-16α,17α-dihydroxy-Δ⁴-D-homoandrostene acetonide is obtained.

Employing the same procedure as in Example VIII but replacing dl-3,11-diketo-9-bromo-16α,17α-dihydroxy-Δ⁴-D-homoandrostene acetonide with an equimolar amount of dl-3,11-diketo-9-bromo-16β,17β-dihydroxy-Δ⁴-D-homoandrostene acetonide an excellent yield of white crystalline dl-3,11-diketo-16β,17β-dihydroxy-Δ⁴-D-homoandrostene acetonide is obtained.

In a similar fashion the isomeric white crystalline d- and l-3,11-diketo-16α,17α-dihydroxy-Δ⁴-D-homoandrostene acetonides and the isomeric white crystalline d- and l-3,11-diketo-16β,17β-dihydroxy-Δ⁴-D-homoandrostene acetonides are obtained from the corresponding bromoketone (compound III).

The next step in the process of this invention is the hydrolysis of the acetal (compound IV) with dilute mineral acid to the corresponding glycol (compound V). As illustrative of this step is the following:

*Example IX*

Substantially 50 parts by weight of dl-3,11-diketo-16α,17α-dihydroxy-Δ⁴-D-homoandrostene acetonide is dissolved in warm dioxane. Thereto is added while agitating approximately 10 parts by weight of 5 percent hydrochloric acid and the solution allowed to cool. The agitation is stopped and the solution set on an ice bath. The so cooled mix is filtered, washed with water and dried. A substantially quantitative yield of a white crystalline product identified as dl-3,11-diketo-16α,17α-dihydroxy-Δ⁴-D-homoandrostene is obtained.

Similarly white crystalline dl-3,11-diketo-16β,17β-dihydroxy-Δ⁴-D-homoandrostene is obtained by the acid hydrolysis of dl-3,11-diketo-16β,17β-dihydroxy-Δ⁴-D-homoandrostene acetonide.

Also the isomeric white crystalline d- and l-3,11-diketo-16α,17α-dihydroxy-Δ⁴-D-homoandrostenes and the isomeric d- and l-3,11-diketo-16β,17β-dihydroxy-Δ⁴-D-homoandrostenes are obtained by the acid hydrolysis of the corresponding acetal (compound IV).

In the next step of the process of this invention the glycol (compound V) is oxidized to form the dialdehyde (compound VI), which dialdehyde is preferably not recovered but converted directly to 3,11-diketo-17-aldehyde-Δ⁴,¹⁶-androstadiene (compound VII) by treating with ammonium acetate or an amine acetate in the presence of an inert organic solvent such as benzene, toluene, xylene and the like. As illustrative of these steps is the following:

*Example X*

45 parts by weight of dl-3,11-diketo-16α,17α-dihydroxy,Δ⁴-D-homoandrostene is dissolved in 2000 parts by weight of dioxane. Thereto is added a solution of 45 parts by weight of periodic acid dihydrate in 800 parts by weight of water. The mix so obtained is agitated at 0° C. under an atmosphere of nitrogen for 14 hours. Thereupon the dioxane is distilled off under reduced pressure and the residue taken up with water. The aqueous phase is then extracted with several 100 parts by weight portions of ether. The ether extracts are combined and washed with a 5% aqueous sodium carbonate solution. The organic layer is then dried over magnesium sulfate and filtered. Upon removing the ether from the filtrate so obtained the residue is dissolved in 2500 parts by weight of benzene. To the solution so obtained is added 20 parts by weight of acetic acid and 10 parts by weight of piperidine and the mix so obtained heated at 60° C. for one hour in an atmosphere of nitrogen. The resultant mix is cooled and washed successively with 5% hydrochloric acid, 5% aqueous sodium carbonate, and finally with water. The benzene layer is then dried over magnesium sulfate and filtered. The solution is evaporated to dryness and upon recrystallizing the residue from benzene there is obtained 28 parts by weight of white crystalline dl-3,11-diketo-17-aldehyde-Δ⁴,¹⁶-androstadiene.

Similarly the aforedescribed dl-3,11-diketo-17-aldehyde-Δ⁴,¹⁶-androstadiene is obtained from dl-3,11-diketo-16β,17β-dihydroxy-Δ⁴-D-homoandrostene. In a similar fashion white crystalline d-3,11-diketo-17-aldehyde-Δ⁴,¹⁶-androstadiene is obtained from either d-3,11-diketo-16α,17α- or d-3,11-diketo-16β,17β-dihydroxy-Δ⁴-D-homoandrostene and white crystalline l-3,11-diketo-17-aldehyde-Δ⁴,¹⁶-androstadiene is obtained from either l-3,11-diketo-16α,17α- or l-3,11-diketo-16β,17β-dihydroxy-Δ⁴-D-homoandrostene in accordance with the process of Example X.

The above described 3,11-diketo-17-aldehyde-Δ⁴,¹⁶-androstadiene while having hormonal activity of itself is also useful in preparing other compounds having hormonal activity, as for example 11-keto progesterone. As illustrative of such is the following: the 16-17 double bond is hydrogenated and the substituted aldehyde so formed, namely 3,11-diketo-17-aldehyde-Δ⁴-androstene, is reacted with the Grignard reagent (e. g. methyl magnesium bromide) which addition product is reacted with ethylene glycol in the presence of a trace of acid and is then subjected to oxidization to form the 3-ethylene dioxy derivative of 11-keto progesterone which compound upon acid hydrolyses readily yields 11-keto progesterone.

It is to be understood that the invention is not limited to the exact details of operation of the compounds shown and described, since obvious modifications and equivalents will be apparent to those skilled in the art and are to be construed to be within the spirit and scope of this invention.

What is claimed is:
1. 3,11-diketo-17-aldehyde-Δ⁴,¹⁶-androstadiene.
2. dl-3,11-diketo-17-aldehyde-Δ⁴,¹⁶-androstadiene.
3. d-3,11-diketo-17-aldehyde-Δ⁴,¹⁶-androstadiene.
4. l-3,11-diketo-17-aldehyde-Δ⁴,¹⁶-androstadiene.
5. The method of making the compound of claim 1 which comprises (a) oxidizing 3,11-diketo-16,17-dihydroxy-Δ⁴-D-homoandrostene with periodic acid, (b) heating the oxidized product so obtained in the presence of piperidine acetate, (c) and recovering 3,11-diketo-17-aldehyde-Δ⁴,¹⁶-androstadiene.
6. The method of making the compound of claim 2 which comprises (a) oxidizing dl-3,11-diketo-16α,17α-dihydroxy-Δ⁴-D-homoandrostene with periodic acid, (b)

heating the oxidized product so obtained in the presence of piperidine acetate, (c) and recovering dl-3,11-diketo-17-aldehyde-Δ$^{4,16}$-androstadiene.

References Cited in the file of this patent

UNITED STATES PATENTS

| | | |
|---|---|---|
| 2,324,881 | Ruzicka | July 20, 1943 |
| 2,351,637 | Ruzicka | June 20, 1944 |
| 2,357,364 | Stavely | Sept. 5, 1944 |
| 2,563,247 | Kendall | Aug. 7, 1951 |
| 2,681,366 | Woodward | June 15, 1954 |

FOREIGN PATENTS

| | | |
|---|---|---|
| 1,052,395 | France | Sept. 23, 1953 |